US009450364B2

(12) United States Patent
Tremaine et al.

(10) Patent No.: US 9,450,364 B2
(45) Date of Patent: Sep. 20, 2016

(54) TAPE LIGHT ELECTRICAL CONNECTOR

(71) Applicant: QTran, Inc., Milford, CT (US)

(72) Inventors: John M. Tremaine, New Canaan, CT (US); Adrian R. Teschemaker, West Haven, CT (US)

(73) Assignee: QTRAN, INC., Milford, CT (US)

( * ) Notice: Subject to any disclaimer, the term of this patent is extended or adjusted under 35 U.S.C. 154(b) by 68 days.

(21) Appl. No.: 14/574,925

(22) Filed: Dec. 18, 2014

(65) Prior Publication Data

US 2015/0303632 A1 Oct. 22, 2015

Related U.S. Application Data

(60) Provisional application No. 61/919,382, filed on Dec. 20, 2013.

(51) Int. Cl.

*B60Q 1/26* (2006.01)
*H01R 33/94* (2006.01)
*H01R 43/20* (2006.01)
*H01R 13/50* (2006.01)

(52) U.S. Cl.

CPC ............ *H01R 33/94* (2013.01); *H01R 13/501* (2013.01); *H01R 43/20* (2013.01)

(58) Field of Classification Search

CPC ................................ H01R 13/73; H01R 1/26
USPC .................. 439/574, 575, 661, 619; 326/227
See application file for complete search history.

(56) References Cited

U.S. PATENT DOCUMENTS

| | | | | | |
|---|---|---|---|---|---|
| 4,012,093 | A * | 3/1977 | Crane | H01R 12/777 | 361/750 |
| 6,200,169 | B1 * | 3/2001 | Tseng | H01R 33/09 | 439/619 |
| 7,281,953 | B1 * | 10/2007 | Jochym | H01R 31/06 | 361/749 |
| 2001/0051462 | A1 * | 12/2001 | Yoshida | H01K 1/44 | 439/619 |
| 2009/0073692 | A1 * | 3/2009 | Berger | A47B 97/00 | 362/249.02 |

* cited by examiner

*Primary Examiner* — Phuongchi T Nguyen

(74) *Attorney, Agent, or Firm* — Ware, Fressola, Maguire & Barber LLP

(57) ABSTRACT

The present invention is directed to a tape light electrical connector that is configured to electrically and physically connect a tape light, such as a light emitting diode (LED) tape light and a lead wire together in order to provide electrical continuity between the tape light and the lead wire, and to prevent physical separation of the tape light from the lead wire, once the tape light and the lead wire have been coupled to the tape light electrical connector. The electrical connector may further be configured to allow for removal of the lead wire and the tape light from the electrical connector, and accordingly the electrical connector may be reusable for installation of other lead wires and tape lights to be connected thereto.

14 Claims, 7 Drawing Sheets

EXPLODED VIEW

ISOMETRIC VIEW 1

ISOMETRIC VIEW 2

BACK VIEW

SIDE VIEW

TOP VIEW

ISOMETRIC VIEW 11
12
10
44
72
40
46
53
20
30
TOP VIEW 10
44
40
46
20
30
SIDE VIEW 10
30
42
46
20
BACK VIEW

CONNECTOR PIN UP SECTION

CONNECTOR PIN DOWN SECTION

EXPLODED VIEW

TAPE LIGHT ELECTRICAL CONNECTOR

CROSS-REFERENCE TO RELATED APPLICATIONS

This application claims priority to U.S. Provisional Appl. No. 61/919,382 filed Dec. 20, 2013, which is hereby incorporated by reference in its entirety.

BACKGROUND OF THE INVENTION

1. Field of the Invention

The present invention generally relates to electrical connectors, and more particularly relates to an electrical connector for connecting a light emitting diode tape light to a lead wire.

2. Description of Related Art

Light emitting diode (LED) tape lighting is becoming a popular form of lighting due to its small size, flexibility, adaptability to a variety of application and lower electrical usage. However, connections between the tape lights and lead wires typically requires soldering of wires between the LED tape and the lead wires. This solder connection may be time consuming and difficult to make during installation or the tape light in the field, and may also become a point of failure during installation and/or use of the tape light. Furthermore, when the tape light is cut to length in the field it is usually necessary to make these solder connections, which have the restrictions mentioned above. Due to these difficulties, it is generally desirable to have pre-cut lengths of the tape light provided from a manufacturer in order to reduce the need to make such connections. However, there are limitations to the lengths that a manufacture can economically provide in order to accommodate all type of orders. Therefore, what is needed is a connector that can efficiently connect LED tape lights to lead wires without the need for soldering, and provide a durable connection throughout the life of the LED tape light.

SUMMARY OF THE INVENTION

The present invention is designed to overcome the above noted limitations that are attendant upon the use of conventional tape light electrical connection techniques and, toward this end, it contemplates the provision of a novel tape light electrical connector.

It is an object of the present invention to provide an electrical connector configured to connect a tape light to a power source, such as by physically and electrically coupling the tape light to a lead wire.

It is another object of the present invention to provide an electrical connector that can be mounted to a surface in order to provide a stable connection between a tape light and a lead wire.

It is yet another object of the present invention to provide an electrical connector configured to provide suitable electrically conductive connection between a tape light and a lead wire.

It is still another object of the present invention to provide an electrical connector that allows for the removal of a tape light and/or a lead wire coupled thereto.

It is yet another object of the present invention to provide an electrical connector that provides sufficient indicia related to the polarity of the electrical connections made between a tape light and/or a lead wire coupled thereto.

It is still another object of the present invention to provide an electrical connector that allows for a tape light to be cut to an appropriate length during field installation of the tape light.

It is yet another object of the present invention to provide an electrical connector that allows a lead wire to be connected to the connector when the connector is directly adjacent to a corner.

It is still another object of the present invention to provide an electrical connector that is reusable for the physical and electrical connection of tape lights to lead wires.

It has now been found that the foregoing and related objects can be readily attained in an electrical connector that includes a tape light receiving end and a lead wire receiving end. The tape light receiving end and the lead wire receiving end are connected by at least one terminal strip that provides electrical continuity between the tape light receiving end and the lead wire receiving end. The tape light receiving end include a tray and a clamping portion movable relative to the tray in order to provide a clamping force against a tape light inserted into the tray and to provide a suitable electrically conductive connection between the tape light and the at least one terminal strip. The lead wire receiving end includes openings for insertion of the lead wire in order to contact the conductors of the lead wire with the at least one terminal strip, and at least one set screw for each terminal strip configured to cause clamping of the terminal strip onto the conductor so as to provide for a mechanical and electrically conductive connection between the terminal trip and the conductor. In this manner, the electrical connector is configured to provide electrical continuity between the tape light connected to the tape light receiving end and the lead wire connected to the lead wire receiving end.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which.

DETAILED DESCRIPTION OF THE INVENTION

Figure 1:
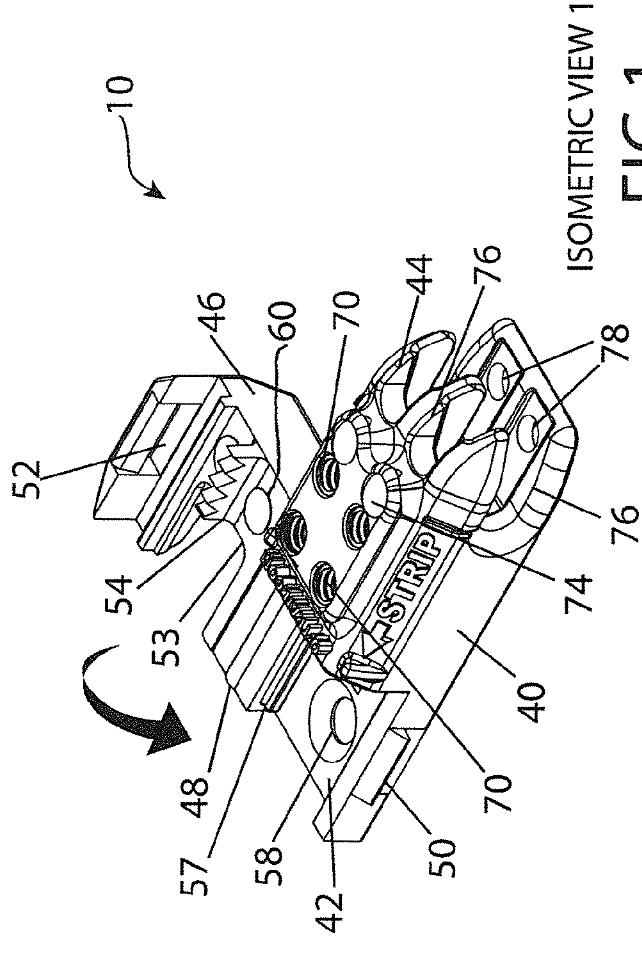
FIG. 1 is an isometric view of an exemplary tape light electrical connector in an open configuration according to the present invention.
Figure 2:
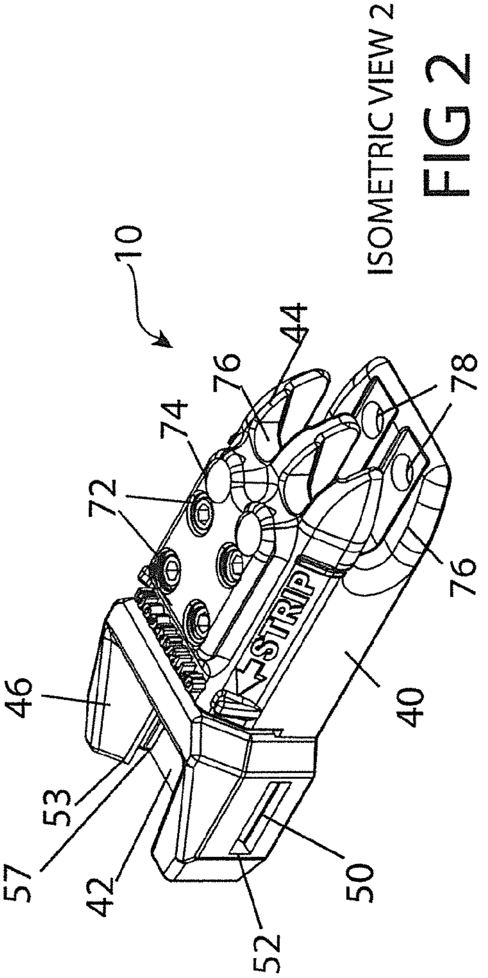
FIG. 2 is an isometric view of the exemplary tape light electrical connector in a closed configuration according to the present invention.
Figure 4:
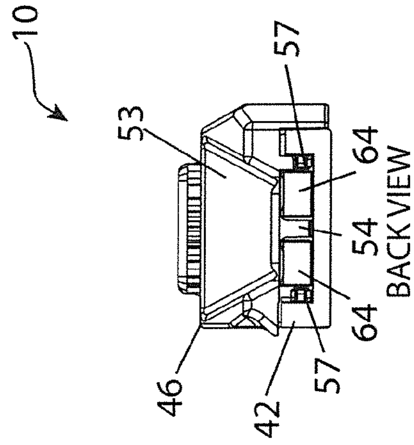
FIG. 4 is a back view of the exemplary tape light electrical connector according to the present invention.
Figure 3:
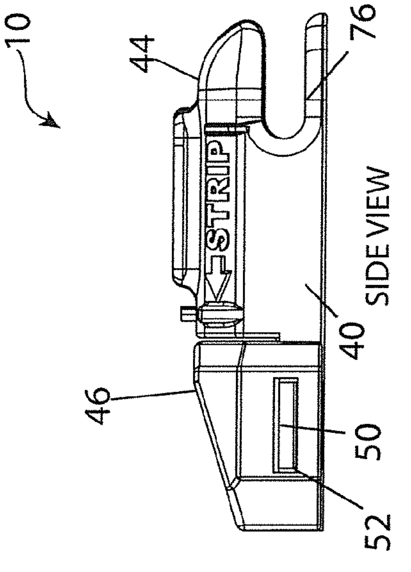
FIG. 3 is side view of the exemplary tape light electrical connector according to the present invention.
Figure 5:
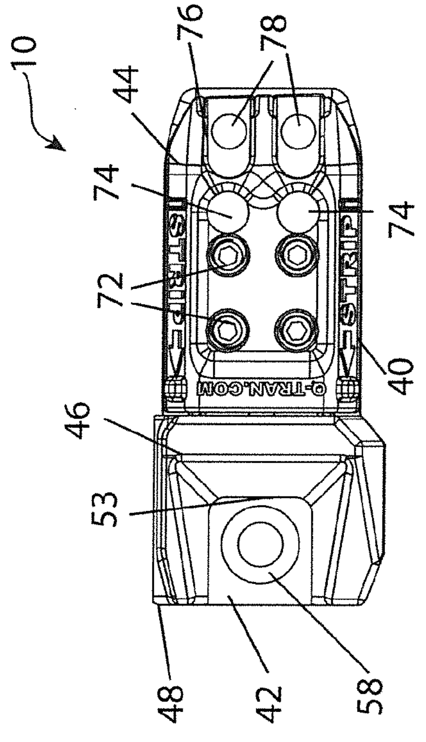
FIG. 5 is a top plan view of the exemplary tape light electrical connector according to the present invention.
Figure 6:
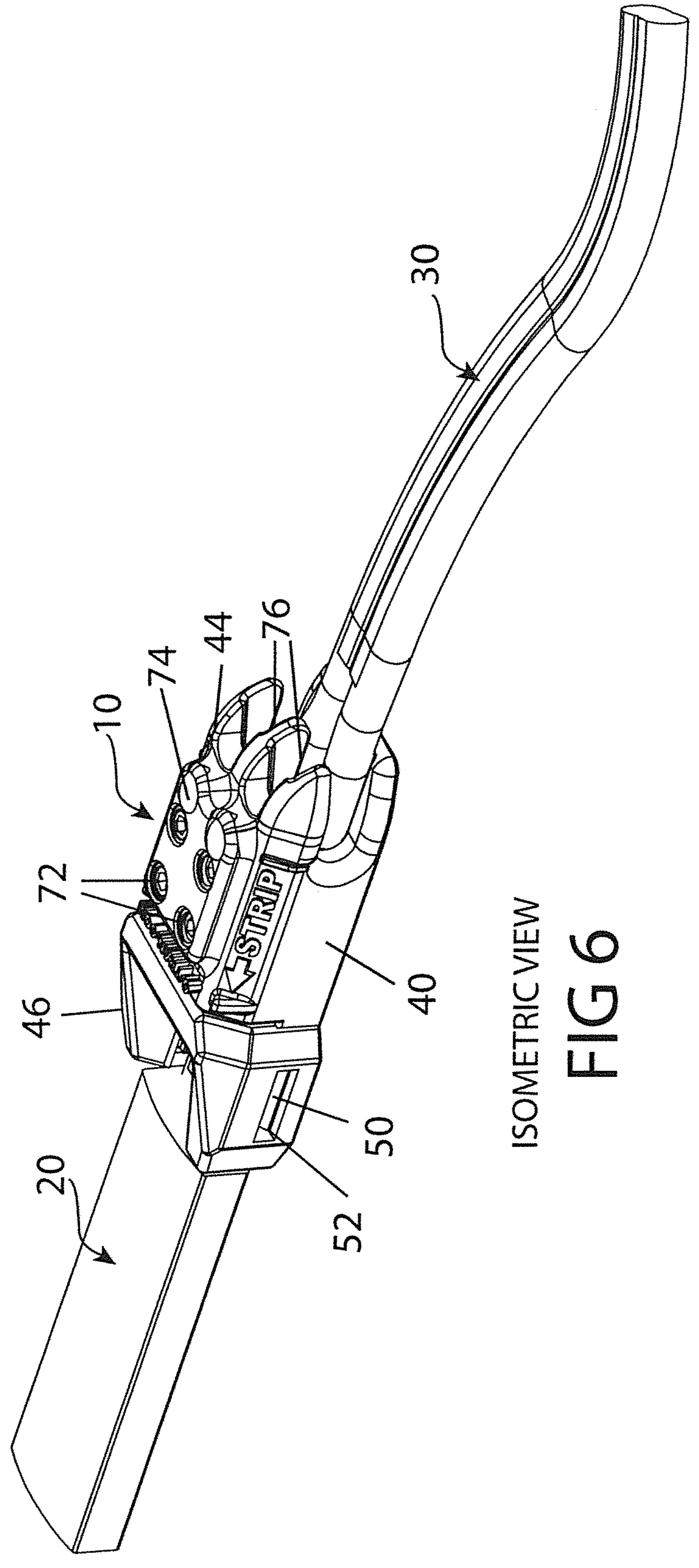
FIG. 6 is an isometric view of the exemplary tape light electrical connector according to the present invention connected to an exemplary tape light and an exemplary lead wire.
Figure 7:
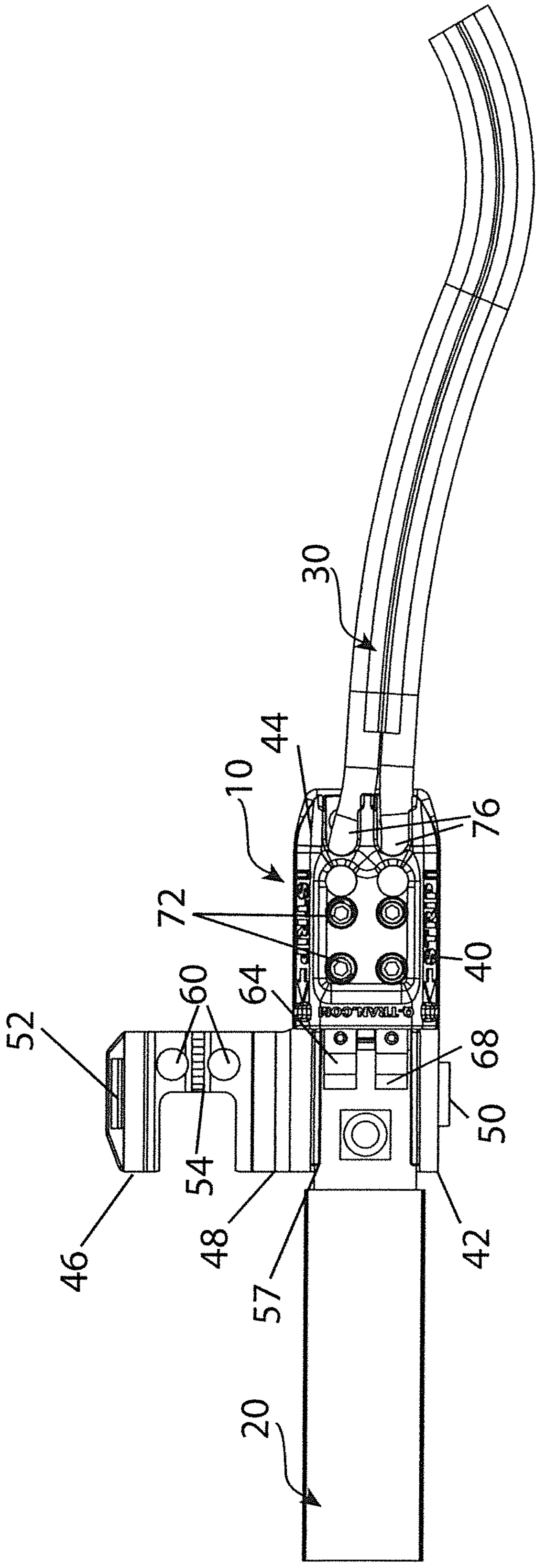
FIG. 7 is a top plan view of the exemplary tape light electrical connector according to the present invention in the open configuration coupled to the tape light and the lead wire.
Figures 8, 9, 10:
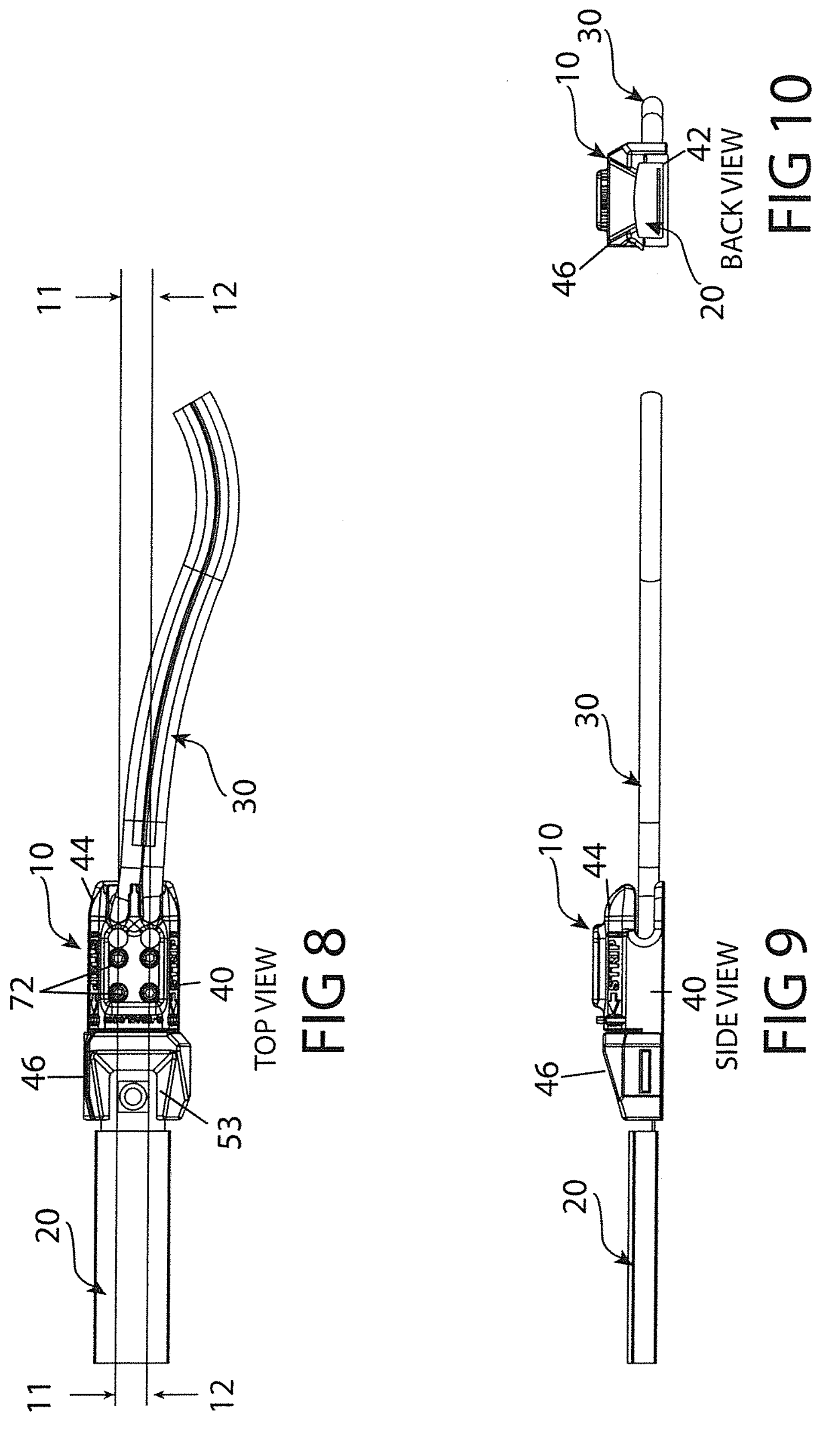
FIG. 8 is a top plan view of the exemplary tape light electrical connector according to the present invention in the closed configuration coupled to the tape light and the lead wire.
FIG. 9 is a side view of the exemplary tape light electrical connector according to the present invention in the closed configuration coupled to the tape light and the lead wire.
FIG. 10 is a rear view of the exemplary tape light electrical connector according to the present invention in the closed configuration coupled to the tape light and the lead wire.
Figure 11:
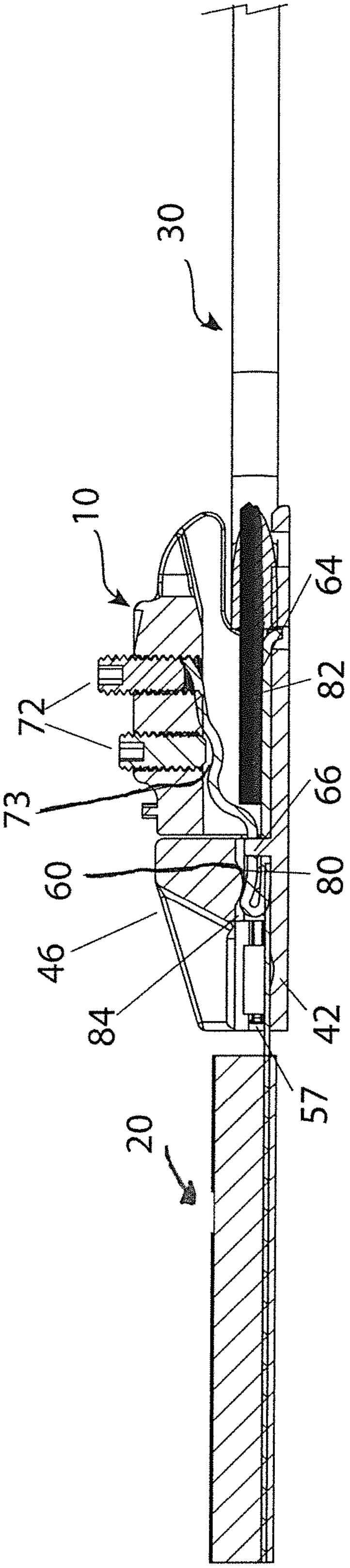
FIG. 11 is a cross-sectional view taken along line 11-11 in FIG. 8 of the exemplary tape light electrical connector according to the present invention with the set screws up in an untightened position.
Figure 12:
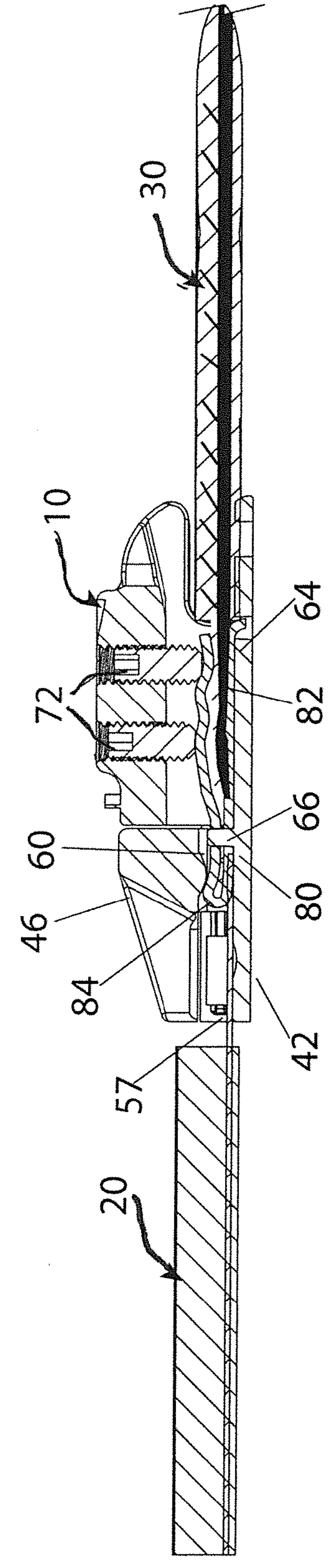
FIG. 12 is a cross-sectional view taken along line 12-12 in FIG. 8 of the exemplary tape light electrical connector according to the present invention with the set screws down and in a tightened position.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 13:
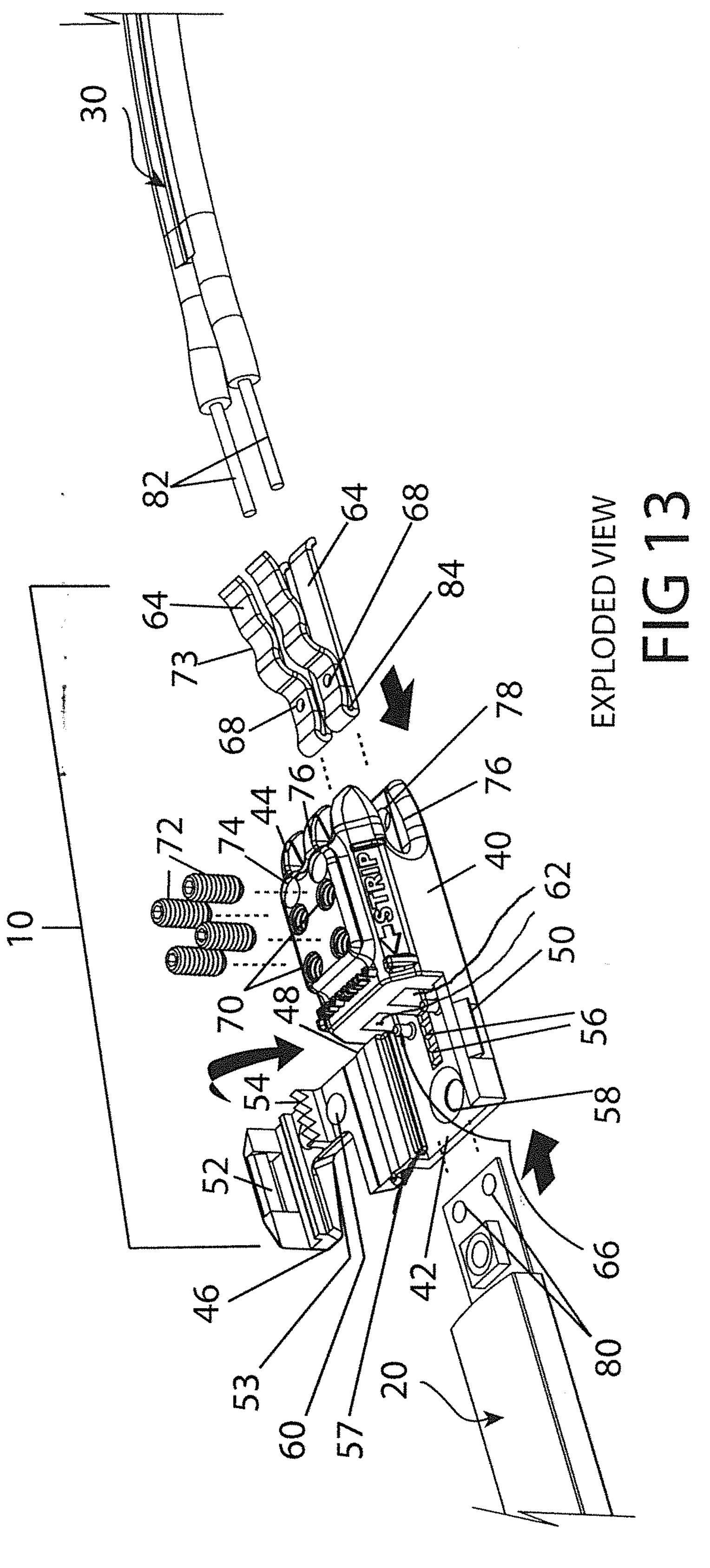
FIG. 13 is an exploded isometric view of the exemplary tape light electrical connector according to the present invention showing how connections to the tape light and the lead wire are made.

Referring now to FIGS. 1-5 and 13, therein illustrated is an exemplary embodiment of a tape light electrical connector, generally indicated by reference numeral 10, according to the present invention. The tape light electrical connector 10 is configured to electrically and physically connect a tape light, such as a light emitting diode (LED) tape light and generally indicated by reference numeral 20 in FIG. 13, and a lead wire, generally indicated by reference numeral 30 in FIG. 13, together in order to provide electrical continuity between the tape light 20 and the lead wire 30 and to prevent physical separation of the tape light 20 from the lead wire 30, once the tape light 20 and the lead wire 30 have been coupled to the tape light electrical connector 10. Still referring to FIGS. 1-5 and 13, the tape light electrical connector 10 includes a body portion 40 having a tape light receiving tray 42 and a lead wire end 44 positioned at opposite ends of the body portion 40 from each other. The body portion 40 may be made from any suitable insulating material, such as any type of electrically insulating plastic and/or polymer material. The tape light receiving tray 42 is configured and dimensioned so as to receive an end portion of the tape light 20, and is connected to a clamping portion 46 by a living hinge 48. The living hinge 48 is configured to allow for actuation of the clamping portion 46 between an open configuration, as shown in FIGS. 1 and 13, and a closed configuration, as shown in FIGS. 2-5. The clamping portion 46 may be secured in the closed configuration relative to the tape light receiving tray 42 through cooperation of a closure tab 50 positioned on the tape light receiving tray 42 and a tab receiving passage 52 formed in the clamping portion 46. It is understood that the cooperation of the closure tab 50 and the tab receiving passage 52 acts to secure the clamping portion 46 in the closed configuration, but also allows for re-opening of the clamping portion 46 to the open configuration through application of sufficient force to separate the closure tab 50 from the tab receiving passage 52. The clamping portion 46 may include a tapered opening 53 so as to accommodate a light element, for example a light emitting diode (LED), of the tape light 20.

Still referring to FIGS. 1-5 and 13, the tape light electrical connector 10 may also include a gripping mechanism 54 extending from the clamping portion 46. The gripping mechanism 54 may have a saw-tooth configuration, and be configured to produce a clamping force on the tape light 20 in cooperation with the clamping portion 46 so as to cause a slight deformity in the tape light 20 in order to assist in securing the tape light 20 to the tape light electrical connector 10 when the clamping portion 46 is in the closed configuration. The tape light receiving tray 42 may include one or more indents 56 that are aligned to receive the gripping mechanism 54 when the clamping portion 46 is in the closed configuration. The tape light receiving tray 42 may also include at least one side rib 57 that is configured to facilitate alignment and retention of the tape light 20 in the tape light electrical connector 10. The tape light receiving tray 42 may also include a countersunk opening 58 configured to receive a fastener (not shown) that may be used to secure the tape light electrical connector 10 to a surface (not shown). The fastener (not shown) may be any suitable screw, nail or bolt, and preferably should be flush with the tape light receiving tray 42 when installed in the countersunk opening 58. The tape light electrical connector 10 may also include one or more dome features 60 extending from the clamping portion 46. As discussed further below, these dome features 60 facilitate the electrical connection between the tape light 20 and the tape light electrical connector 10.

Continuing to refer to FIGS. 1-5 and 13, the tape light receiving tray 42 and the lead wire end 44 are connected by a pair of tunnels 62 extending through the body portion 40 of the tape light electrical connector 10. Each of the pair of tunnels 62 are configured to receive a terminal strip 64 that extends from the tape light receiving tray 42 to the lead wire end 44. Each terminal strip 64 may be secured at the tape light receiving tray 42 by a post 66 that is passed through an opening 68 in each terminal strip 64, in order to prevent removal of each terminal strip 64 from the tape light electrical connector 10. Each terminal strip 64 may be formed from any suitable electrically conductive metal, and may for example be made from nickel plated phosphor bronze, or another electrically conductive metal such as copper or tin plated copper. The body portion 40 of the tape light electrical connector 10 may also include one or more threaded openings 70 that are linked to one of the pair of tunnels 62, i.e. each one of the pair of tunnels 62 is linked to at least one threaded opening 70. Each of the threaded openings 70 is configured to threadenly receive a set screw 72 that is configured and positioned to contact one of the terminal strips 64 as the set screw 72 is threaded, e.g. tightened, into one of the threaded openings 70 of the body portion 40 of the tape light electrical connector 10. It is understood that the threaded openings 70 may be formed as integral parts of the body portion 40, or be threaded inserts that are integrated into the body portion 40 of the tape light electrical connector 10. Each terminal strip 64 may include at least one indented portion 73 in order to increase the clamping pressure that may be produced by the terminal strip 64 as the set screw 72 is threaded towards the terminal strip 64. It is understood that while two set screws 72 are shown for each tunnel 62 and terminal strip 64, the present invention is not limited to any particular number of set screws 72, and one or more set screws 72 for each tunnel 62 and terminal strip 64 may be used in accordance with the present invention. The body portion 40 may also include round recesses 74 positioned adjacent to the threaded openings 70 in order to allow for indicia (not shown) related to the polarity of the conductors of the lead wire 30 connected to the respective terminal strip 64.

Still referring to FIGS. 1-5 and 13, the lead wire end 44 may also include one or more notches 76 formed therein, which are configured to allow the lead wire 30 to be bent around the body portion 40 of the tape light electrical connector 10 so that the tape light electrical connector 10 can be installed close to a surface (not shown) that is substantially perpendicular to the surface (not shown) to which the tape light electrical connector 10 has been installed, e.g. in a corner. The notches 76 may be positioned so as to form a comb structure on the lead wire end 44 of the tape light electrical connector 10. The lead wire end 44 may also include one or more openings 78 formed therein, which are configured to permit securing the tape light electrical connector 10 by one or more fasteners, such as a screw, to the surface which the tape light electrical connector 10 is to be mounted to.

Referring now to FIGS. 6-13, the operation and use of the tape light electrical connector 10 for electrically and physically coupling the tape light 20 and the lead wire 30 will now be discussed. As shown particularly in FIG. 13, the tape light 20 include a pair of leads 80, one being a positive lead and the other being a negative lead, that require connection to an electrical source (not shown) in order to provide power to the tape light 20. As also particularly shown in FIG. 13, the lead wire 30 includes a pair of conductors 82, one being a positive lead and the other being a negative lead, that are configured to provide power from an electrical source (not shown) connected to the lead wire 30. The conductors 82 may be formed from any suitable electrically conductive metal, for example copper or tin plated copper, and may be formed of stranded or solid wire. It is understood that for the purposes of the present invention it does not matter which lead 80 or which conductor 82 is positive or negative, as long as the tape light electrical connector 10 connects the positive lead 80 with the positive conductor 82 and the negative lead 80 with the negative conductor 82.

In order to couple the tape light 20 the tape light electrical connector 10, the clamping portion 46 is placed in the open configuration (FIGS. 7 & 13), and then the tape light 20 is inserted into the tape light receiving tray 42 underneath the side ribs 57 until the leads 80 are positioned beneath the rounded toe portions 84 of the terminal strips 64. The rounded toe portions 84 of the terminal strips 64 may have a slight upward bend relative to the tape light receiving tray 42. The clamping portion 46 may then be moved into the closed configuration (FIGS. 6, 8-12) so that the dome features 60 come into contact with the rounded toe portions 84 of the terminal strips 64 thereby pressing the rounded toe portions 84 into intimate contact with the leads 80 of the tape light 20 so as to produce a suitable electrically conductive connection between the terminal strips 64 and the tape light 20. In addition, as mentioned above, the gripping mechanism 54 of the clamping portion 46 also acts upon the tape light 20 to slightly dimple the tape of the tape light 20 in order to facilitate securing the tape light 20 to the tape light electrical connector 10.

Either prior to or subsequent to coupling the tape light 20 to the tape light electrical connector 10, the conductors 82 of the lead wire 30 may also be coupled to the tape light electrical connector 10 in the following manner. Using the strip length guide provided on the body portion 40 of the tape light electrical connector 10 an appropriate amount of insulation is removed from each conductor 82 of the lead wire 30. Once the insulation has been removed from the conductors 82, each conductor 82 may then be inserted into the appropriate tunnel 62 depending upon the polarity of the conductor 82 and the leads 80 connected to or to be connected to the terminal strip 64 contained within each tunnel 62. The conductor 82 is positioned within the open terminal strip 64, as shown for example in FIG. 11, and then one or more of the set screws 72 may be tightened in order to compress each terminal strip 64, as shown for example in FIG. 12. The compression of the terminal strip 64 by the set screws 72 provides for both a mechanical coupling of the conductor 82 to the tape light electrical connector 10 so as to prevent or inhibit removal of the conductor 82 from the tape light electrical connector 10, and an electrically conductive connection between the terminal strip 64 and the conductor 82. In this manner, once the electrically conductive connection between the leads 80 and the terminal strips 64 has been made as discussed above, and the electrically conductive connection between the conductors 82 and terminal strips 64 has been made the leads 80 of the tape light 20 and the conductors 82 of the lead wire 30 are electrically connected so that power provided to the lead wire 30 may be transferred to the tape light 20 in order to power the lighting elements, for example light emitting diodes (LEDs), contained on the tape light 20.

In order to remove the tape light 20 from the tape light electrical connector 10, the clamping portion 46 is moved into the open configuration (FIGS. 7 & 13) by separating the closure tab 50 from the tab receiving passage 52. The tape light 20 may then be slid out from the tape light receiving tray 42. In order to remove the lead wire 30 from the tape light electrical connector 10, the set screws 72 are loosened so as to relieve and/or reduce the clamping force applied by the terminal strips 64 on the conductors 82, and then the conductors 82 may be removed from the tunnels 62 of the body portion 40 of the tape light electrical connector 10.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A connector comprising:

a body portion having a first end and a second end;

a receiving tray positioned at the first end of the body portion configured to receive a tape light;

at least one tunnel extending through the body portion from the receiving tray to the second end and configured to receive at least one conductor of a lead wire;

at least one terminal strip extending from the receiving tray at the first end of the body portion to the second end of the body portion;

wherein the at least one terminal strip is configured to electrically connect the tape light to the lead wire;

wherein the receiving tray is operatively connected to a clamping portion by a hinge, and the clamping portion is operable between a closed position and an open position;

wherein the tape light is retained on the connector between the clamping mechanism and the receiving tray when the clamping mechanism is in the closed position, and wherein the tape light is removable from the connector when the clamping mechanism is in the open position.

2. The connector according to claim 1, wherein the clamping portion comprising at least one dome feature extending from the clamping portion and configured to compress at least a portion of the terminal strip when the clamping mechanism is in the closed position in order to electrically connect the terminal strip to the tape light.

3. The connector according to claim 1, further comprising a comb structure positioned at the second end of the body portion.

4. The connector according to claim 1, wherein the body portion is comprised of an insulating material, and the at least one terminal strip is comprised of a conductive material.

5. The connector according to claim 1, wherein the receiving tray comprises at least one post, and the at least one terminal strip is configured to be retained by the at least on post.

6. The connector according to claim 1, wherein the clamping portion comprises a gripping mechanism extending there from, and the receiving tray comprises one or more indents dimensioned to accommodate at least a portion of the gripping mechanism when the clamping portion is in the closed position.

7. The connector according to claim 6, wherein the gripping mechanism acts in cooperation with the one or more indents to deform at least a portion of the tape light received within the receiving tray when the clamping mechanism is in the closed position in order to retain the tape light in the receiving tray.

8. The connector according to claim 1, wherein a terminal strip of the at least one terminal strip is positioned at least partially within each tunnel of the at least one tunnel, and wherein the terminal strip comprises a toe portion forming a closed end of the terminal strip and a first extension and a second extension extending from the toe portion and spaced apart from each other.

9. The connector according to claim 8, wherein the at least one tunnel comprises a first opening positioned adjacent to the receiving tray and having at least a portion of the toe portion of the terminal strip extending there from, and wherein at least a portion of each of the first extension and the second extension are positioned within the tunnel.

10. The connector according to claim 9, wherein the body portion further comprises a threaded opening extending through the body portion and perpendicularly intersecting with the tunnel.

11. The connector according to claim 10, further comprising a screw threadenly received in the threaded opening, and configured for movement in a first direction away from the tunnel and in a second direction towards the tunnel.

12. The connector according to claim 11, wherein the terminal strip is configured to receive the at least one conductor of the lead wire between the first extension and the second extension, and wherein when the screw is moved in the second direction towards the tunnel, the screw is configured to urge the first extension towards the second extension and thereby physically and electrically connect the conductor to the terminal strip.

13. A method, comprising:

physically and electrically connecting a tape light to a connector; and physically and electrically connecting a lead wire to the connector so that the lead wire and tape light are electrically connected;

wherein the connector comprises:

a body portion having a first end and a second end;

a receiving tray positioned at the first end of the body portion configured to receive a tape light;

at least one tunnel extending through the body portion from the receiving tray to the second end and configured to receive at least one conductor of a lead wire;

at least one terminal strip extending from the receiving tray at the first end of the body portion to the second end of the body portion and is configured to electrically connect the tape light to the lead wire.

14. The method according to claim 13, further comprising:

removing the tape light from the connector; and removing the lead wire from the connector.

* * * * *